Figure 1:
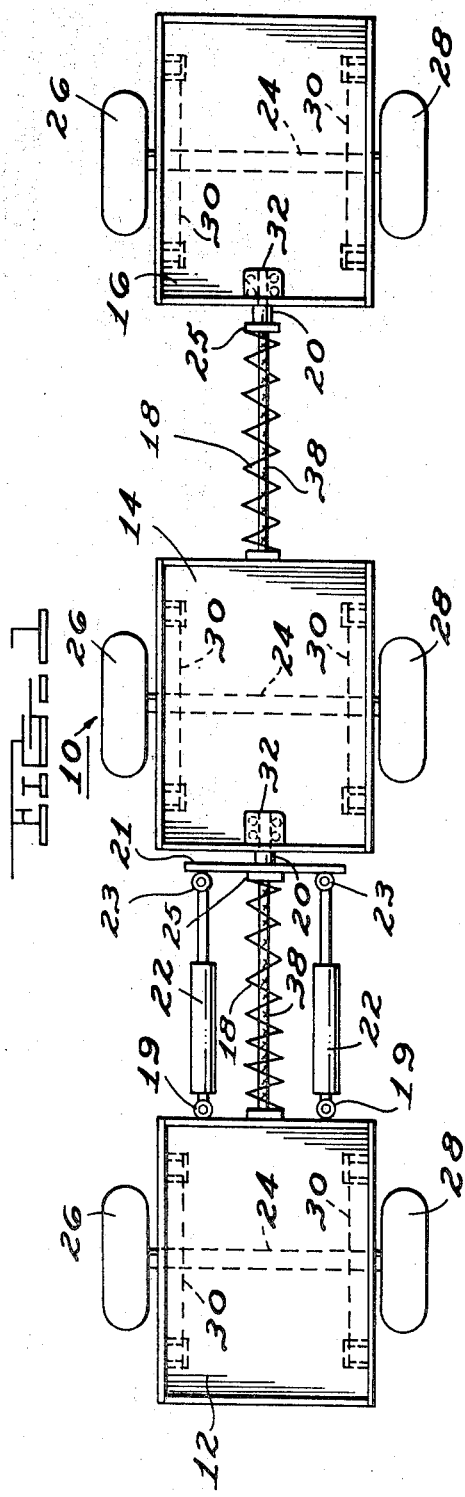
Figure 2:
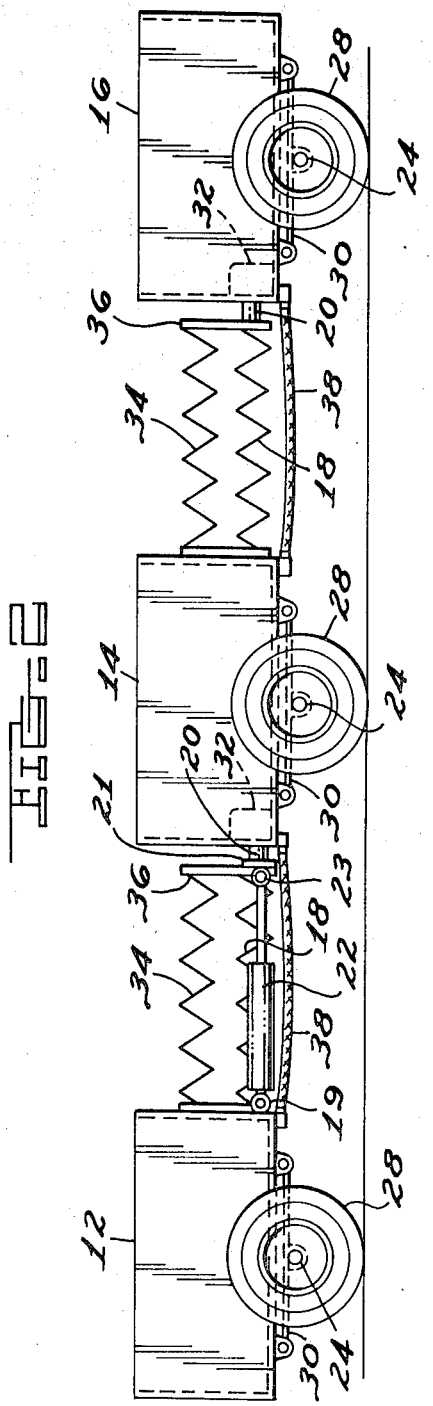

United States Patent

[11] 3,550,710

| [72] | Inventor | Paul L. Spanski |
| | | Bloomfield Hills, Mich. |
| [21] | Appl. No. | 775,722 |
| [22] | Filed | Nov. 14, 1968 |
| [45] | Patented | Dec. 29, 1970 |
| [73] | Assignee | the United States of America as represented by the Secretary of the Army |

[54] FLEXIBLE FRAME VEHICLE
10 Claims, 2 Drawing Figs.

[52] U.S. Cl. .................................................. 180/14, 280/483, 280/408
[51] Int. Cl. ..................................................... B62d 59/00
[50] Field of Search........................................... 180/14, 12, 66; 280/408, 483, 446, 474, 477, 409, 410, 486, 487

[56] References Cited
UNITED STATES PATENTS

| 1,237,355 | 8/1917 | McTighe ..................... | 280/446 |
| 2,727,581 | 12/1955 | Wright ......................... | 180/12 |
| 3,216,735 | 11/1965 | Larson et al. ................. | 280/408 |
| 3,235,020 | 2/1966 | Bekker ......................... | 180/12 |
| 3,246,714 | 4/1966 | Middlesworth et al. ...... | 180/14 |

Primary Examiner—Leo Friaglia
Assistant Examiner—Robert R. Song
Attorneys—Harry A. Saragovitz, Edward J. Kelly, Herbert Berl and A. L. Girard ABSTRACT: A vehicle adapted for rough terrain performance and obstacle negotiation comprising a plurality of units, interconnected by at least one helical spring the plurality of units thus being flexible in the pitch, yaw and roll directions.

PATENTED DEC 29 1970

3,550,710

PAUL L. SPANSKI
INVENTOR
Harry M. Saragovitz
Edward J. Kelly
BY Herbert Berl
& A. L. Girard
ATTORNEYS

FLEXIBLE FRAME VEHICLE

The present invention relates to high performance rugged terrain vehicles and more specifically to one of the multiunit flexible frame type.

One of the most successful of the prior art flexible frame vehicles is that disclosed in U.S. Pat. No. 3,235,020 issued 15 Feb. 1966 to Bekker and assigned to General Motors Corp. This patent provides for a multiunit rugged terrain vehicle having a plurality of units connected together by a spring frame means having an effective cross section thin in the vertical direction and thick in the horizontal direction and thus being highly flexible in the pitch and roll direction and substantially inflexible in the lateral direction. The principle difficulties with this design as well as previous elastic frame concepts have been related to steering frame geometry and high speed stability. This was primarily due to the fact that previous concepts such as that mentioned above featured elastic elements which, as described, were flexible in the pitch plane as well as torsionally flexible but essentially rigid in the yaw or horizontal plane. Steering thus required the addition of a mechanical joint of one type or another between the units of a vehicle or as in some of the concepts a joint where the elastic frame joined the axle. The introduction of such a joint concurrently initiated several problems. Among these problems are the following: tracking irregularity, lack of high speed stability, and mechanical complexity. The substance of the corrective measures offered to solve these problems, a number of which are described reference, amount to one or more auxiliary damping devices which add not only to the weight of the vehicle but to the complexity of the entire structure.

It is therefore an object of the present invention to provide a rough terrain multiunit vehicle possessing improved performance characteristics.

Another object of the present invention is to provide a vehicle as described above which is mechanically simple and hence longer wearing and more cheaply and easily maintained.

Still another object of the present invention is the provision of a vehicle of the type described above possessing superior tracking regularity of a degree unachieved in vehicles of this type until the present invention.

Other objects and advantages of the present invention will become apparent to those of ordinary skill in the art by the following description when considered in relation to the accompanying drawing of which:

FIG. I is a plan view of the vehicle of the present invention;

FIG. II is a side schematic view of a preferred embodiment of the vehicle of the present invention.

The basic model concept of the present invention is the use of one or more helical springs as the elastic frame elements thereby totally eliminating the need for mechanical joints for steering purposes, and providing additional flexibility for the vehicle in the yaw direction, thus providing complete freedom of motion in all three directions of motion.

Referring to the drawing, FIG. I shows a plan view of the multiunit vehicle of the present invention. As shown, the vehicle 10 comprises, in this case, vehicle units 12, 14 and 16, each of which may contain individual power plants or cargo or passenger space. Linking the three vehicle units are helical springs 18 which might be joined directly to the vehicle unit bodies but which, as shown in the preferred embodiment depicted here, are joined to arbor 20 whose mounting within the individual vehicle unit body will be described below. In the embodiment shown in FIG. I steering is accomplished by hydraulic cylinders pivotally mounted between the first and second units of the composite vehicle.

As shown in FIG. I, the hydraulic steering cylinders are pivotally mounted upon vehicle unit 12 by means of ball-type joints 19. Connection to the second or rearward vehicle is provided by joining steering cylinders 22 to a steering rod 21 by means of ball joints 23. The steering rod 21 is mounted on arbor 20 so that the steering assembly can also rotate and not restrict rotation between vehicle units 12 and 14 in rough terrain. Each of the vehicle units 12, 14 and 16 is mounted upon an axle 24 which has wheels 26 and 28 mounted thereon. Although the unit bodies can be mounted directly on the axle by means of conventional braces or other joining means, it is preferred that they be joined thereto by means of some spring type suspension so that overall ride performance of the vehicle is maximized. One such spring suspension is shown at 30 in FIG. I. This comprises a simple leaf spring arrangement with the leaf spring being joined to the axle 24 and the unit body 12, 14 or 16, being mounted thereon.

In the preferred embodiment shown in FIG. I, the function of allowing roll freedom between the individual units of the vehicle is taken out of the elastic frame element and is accomplished in the anchor at one end thereof which is referred to here as the roll joint assembly. This roll joint assembly comprises arbor 20 mounted in a roller bearing 32 housed within the individual unit body. The roll freedom imparted by such a design allows for maximum conformation to terrain irregularities running laterally to the direction of vehicle travel. Thus, the helical spring arrangement provides for pitch and yaw freedom of movement while the rotatable mounting thereof provides for roll freedom.

Locomotion of the composite vehicle can be accomplished in a number of different ways. For example, the vehicle may comprise a driver unit and one or more of a powered trailer-type unit, the driver unit having an engine which powers the wheels and a transmission, power from a transmission being transferred through a flexible drive shaft of one type or another, which drive shaft is capable of assuming a curved shape when terrain irregularity or load imbalance demand such an orientation. Alternatively, each unit may have its own engine and transmission thus providing a series of self-powered units which through regulation of fuel flow or other conventional means can be made to operate in unision and at uniform velocity. According to the preferred embodiment, a single engine is used to power the composite vehicle. This engine may be located in any of the vehicle units with the power therefrom being transferred to the wheels of the other vehicle units by means of a hydrostatic drive. This phenomenon of individually powered units functionally linked by means of a hydrostatic drive is accomplished by means of a synchronizing device commonly referred to as a flow divider which divides the oil or other hydrostatic fluid, which is driven by a pump utilizing the output of the vehicle engine, into three equal flows each of which in turn drives the axle and wheels of an individual unit. Thus, each unit is driven as in the case where a flexible drive shaft is used, however fewer joints and other members which might affect the flexibility of the vehicle are utilized. The hydrostatic fluid is transmitted between units by flexible hose or tube 38 which links all of the vehicles in the embodiments shown.

In addition to the flexibility provided by this elastic frame concept, the use of helical springs to join the vehicles further provides an auxiliary suspension system which serves to dissipate energy produced by the vehicles in travel over rough terrain.

Investigation to the present has determined that it is not necessarily desirable to have the bending rate of the flexible frame element equal in the pitch and yaw planes. As a result, the preferred embodiment of the invention is shown in FIG. II. It is similar to that shown in FIG. I, except that two coil springs are used at each joint to greatly stiffen the joint in the pitch plane with only a modest increase in the yaw plane. For instance, the original single spring joint had of course an equal pitch and yaw stiffness. In one example of a vehicle constructed according to the designs herein this stiffness was about 5 ft.-lbs/degree. Utilizing the modification shown at FIG. II, two springs stacked vertically on 6-inch centers provided a pitch stiffness of 42 ft.-lbs/degree and a yaw stiffness of 10 ft.-lbs/degree. Another modification raised the pitch stiffness to 116 ft.-lbs/degree, while the yaw stiffness remained at 10 ft.-lbs/degree. The absolute and relative values of pitch and yaw stiffness and the ratios therebetween will depend largely upon the use to which the vehicle is put and the character of the load being carried. The ability to readily tailor these quantities to a particular application without sacrificing the inherent simplicity of the invention appears to be most noteworthy. Such a structure provides a number of additional advances including:

a. providing an auxiliary low-rate suspension for improved vehicle ride and over all performance;

b. absorbing reaction from wheel driving torque and thus maintaining an acceptable attitude (in pitch) for each unit of the vehicle;

c. accomplishing load transfer when the vehicle negotiates vertical obstacles;

d. maintaining general vehicle attitude under static eccentric loads, i.e. the center of gravity of each unit cannot necessarily be expected to fall directly over the single axle, therefore some bending moment may be imposed on the flexible frame members at all times due to the center of gravity location of the individual units;

e. sufficiently limber in the yaw plane to allow easy steering and accurate tracking during maneuvering;

f. maintaining overall stability of the vehicle on smooth, hard surface operation.

Thus, although no optimum rates can be defined for the helical spring members, due to the great variety of applications to which the vehicle may be applied indications are that a yaw stiffness between about 5 and 15 ft.-lbs/degree and a pitch stiffness between about 5 and 150 ft.-lbs/degree would be desirable in the applications presently contemplated for this type of vehicle. The multiple spring structure described above is seen clearly in FIG. II wherein, in addition to helical spring 18 a further helical spring 34 is mounted vertically above spring 18. In order to achieve roll freedom, both of the above helical spring members 18 and 34 are joined to a plate 36 which in turn is mounted on arbor 20. The arbor 20 has its usual configuration in roller bearing 32 mounted in the vehicle unit body. The opposing end of both of the helical springs is fastened according to conventional means to the other unit body. Alternatively, both springs may be joined directly to the unit body. Furthermore, the demands of a variety of applications may call for stiffnesses particularly well achieved using nonvertical or nonhorizontal arrangements of two or more such helical springs in an almost endless variety of modifications of this basic concept. In the embodiment where a single helical spring is used to join the various units of the vehicle, it is of course feasible to rotatably mount both extremities of the spring to provide increased roll freedom and to guarantee the same in the event one of the rotatable mountings is rendered inoperative for one reason or another.

The hydraulic steering apparatus 22, in the embodiment of FIG. II, is joined to steering rod 21 which is again mounted on arbor 20 to provide the roll freedom described above. Although in both FIGS., the steering rod 21 is shown between the spring mounting plates (plates 25 and 36) and arbor 20, it could be attached to arbor 20 either in front of the respective plates 25 and 36 or at some point on arbor 20 removed from plates 21 and 36.

It should also be noted that the use of a plurality of helical springs, i.e. more than two is also contemplated herein, such a structure might be found necessary in the case where extremely heavy or outstandingly delicate loads are to be carried.

In summary, it can be said that the design of the present invention using helical springs in place of laterally rigid flexible frame members provides a mechanical simplicity without pin joint or auxiliary dampers being necessary, provides a vehicle capable of maintaining overall vehicle stability at high speeds, and one having accurate tracking during maneuvering.

Since it is obvious that many changes and modifications can be made in the above described details without departing from the nature and spirit of the invention it is to be understood that the invention is not limited to said details except as set forth in the appended claims.

I claim:

1. A vehicle adapted for rough terrain performance and obstacle negotiation comprising a plurality of units, each unit including a body, an axle having a pair of wheels and means for supporting the body mounted thereon, the weight of each unit being independently borne by the respective wheels thereof, and at least one helical spring connecting one unit to another, with no inflexible coupling therebetween one extremity of said helical spring being rotatably joined to said body of one of said units, the plurality of units then being flexible in the pitch, yaw and roll directions.

2. The vehicle of claim 1 wherein at least one extremity of said helical spring is joined to an arbor which is journaled in a roller bearing mounted on said body of one of said units.

3. The vehicle of claim 1 including means powering each of said units.

4. The vehicle of claim 3 wherein said means powering each of said units comprises an engine mounted in one of said units, a hydrostatic drive which transmits power equally to the axle of each of said units, and means linking said engine to said hydrostatic drive.

5. The vehicle of claim 4 wherein said means supporting the body upon said axle comprises a spring suspension means.

6. The vehicle of claim 1 wherein there are two helical springs joining each of said units to one another.

7. The vehicle of claim 6 including a plate to which both of said helical springs are secured, said plate being mounted upon an arbor which is journaled in a roller bearing mounted on said body of one of said units.

8. 8. The vehicle of claim 6 including means for powering each of said units.

9. The vehicle of claim 8 wherein said means for powering each of said units comprises an engine, a hydrostatic drive which transmits power equally to the axle of each of said units, and means linking said engine to said hydrostatic drive.

10. The vehicle of claim 9 wherein said means supporting the body upon said axle comprises a spring suspension means.